United States Patent [19]

Fossett et al.

[11] Patent Number: 4,538,030

[45] Date of Patent: Aug. 27, 1985

[54] METHOD AND APPARATUS FOR ESTABLISHING TELEPHONE CALLING COSTS

[75] Inventors: Lawrence D. Fossett, Morganville; Steven C. Michael, Freehold, both of N.J.

[73] Assignee: AT&T Information Systems Inc., Holmdel, N.J.

[21] Appl. No.: 559,295

[22] Filed: Dec. 8, 1983

[51] Int. Cl.³ .................... H04M 15/06; H04M 15/34
[52] U.S. Cl. ............................. 179/7.1 TP; 179/7 R
[58] Field of Search .............. 179/7 R, 7 MM, 7.1 R, 179/7.1 TP, 18 B, 18 EA, 10

[56] References Cited

U.S. PATENT DOCUMENTS 4,091,238 5/1978 Samuels et al. .................. 179/7.1 R
4,122,308 10/1978 Weinberger et al. ............. 179/7.1 R

FOREIGN PATENT DOCUMENTS

WO82/01634 5/1982 PCT Int'l Appl. .

OTHER PUBLICATIONS

"Horizon TM Communication System; Custom Service for Small Business", R. R. Desjardins, J. A. Miller and C. D. Weiss, *Bell Laboratories Record*, vol. 55, No. 10, Nov. 1977, pp. 271-275.
"Keeping Your PABX Under Control", B. Koppenhoefer, *Telecommunications*, vol. 14, No. 1, Jan. 1980, pp. 69-74.
"Station Message Detail Recording is a Telecom Budget Watchdog", Lisa Kopf, *Telephony*, May 3, 1982, pp. 24,25.
"Facility Layout and Location—An Analytical Approach", R. L. Francis, J. A. White, published by Prentice-Hall, Inc., 1974, pp. 166-194.

*Primary Examiner*—Gene Z. Rubinson
*Assistant Examiner*—Elio Di Vito
*Attorney, Agent, or Firm*—John A. Caccuro

[57] ABSTRACT

Small communication systems do not have a sufficiently large memory to store the vast amount of data required to determine the cost of interstate telephone calls using the conventional method. The disclosed telephone call cost establishing method and apparatus compresses the amount of data required by supplying a set of coordinates for a central point in each area code. The cost of an interstate call to any central office in an area code is then determined using the coordinates of the central point for that area code. Additionally, certain types of calls are priced using a predetermined price code stored in a variety of tables such as toll call allowed, frequently called numbers, personal line and facility tables.

13 Claims, 12 Drawing Figures

FIG. 4
LONG LINES DISTANCE PROGRAM

FIG. 6
CENTRAL POINTS TABLE

| NPA | Vi | Hi |
|-----|------|------|
| 201 | 5536 | 2828 |
| ⋮ | ⋮ | ⋮ |

FIG. 7
TOLL CALLS ALLOWED (TCA) TABLE

| CLASS | NPA-NNX | PRICE CODE |
|-------|---------|------------|
| 1 | 914 | 4 |
|   | 215 | 4 |
| 2 | 516 | 5 |
|   | 212 | 3 |
| 3 | 215-345 | 3 |
|   | 609-678 | 14 |
| 4 | 577 | 12 |
|   | 949 | 19 |
|   | 431 | 22 |

FIG. 8
FREQUENTLY CALLED NUMBERS (FCN)

| NPA-NNX | PRICE CODE |
|---------|------------|
| 201-834 | 11 |
| ⋮ | ⋮ |
| DEFAULT | 40 |

FIG. 9
PRICE CODE TABLE

| CODE | CONNECT (a) | PER MINUTE (b) |
|------|-------------|----------------|
| 1 | 32¢ | 16¢ |
| 2 | 40¢ | 18¢ |
| ⋮ | (1-9 ARE FOR LONG LINES RATE BANDS.) | |
| 9 | | |
| 10 | 0¢ | 0¢ |
| 11 | 7¢ | 3¢ |
| 12 | 10¢ | 6¢ |
| ⋮ | (11-39 ARE FOR INTRASTATE RATE BANDS, FACILITY ACCESS CODE & PERSONAL LINES.) | |
| 39 | 25¢ | 0¢ |
| 40 | (THE INTRA NPA DEFAULT) | |

FIG. 10
TIME OF DAY DISCOUNT TABLE

INTRASTATE DISCOUNT FACTOR A1/A3

|  | WEEKDAY | SATURDAY | SUNDAY |
|---|---|---|---|
| 8am–5pm | 0% | 60% | 60% |
| 5pm–11pm | 40% | 60% | 40% |
| 11pm–8am | 60% | 60% | 60% |

⎬ E1

LONG LINES DISCOUNT FACTOR A2/A4

|  | WEEKDAY | SATURDAY | SUNDAY |
|---|---|---|---|
| 8am–5pm | 0% | 60% | 60% |
| 5pm–11pm | 40% | 60% | 40% |
| 11pm–8am | 60% | 60% | 60% |

⎬ E2

FIG. 11
FACILITY PRICE CODE TABLE

| ACCESS CODE | PRICE CODE |
|---|---|
| WATS | 5 |
| FX | 4 |
| ⋮ | ⋮ |

FIG. 12
PERSONAL LINE TABLE

| ACCESS CODE | PRICE CODE |
|---|---|
| TEL NO. | 37 |
| ⋮ | ⋮ |

METHOD AND APPARATUS FOR ESTABLISHING TELEPHONE CALLING COSTS

TECHNICAL FIELD

This invention relates to telephone communication systems and more particularly to a method and apparatus for establishing the price of telephone calls made therefrom.

BACKGROUND OF THE INVENTION

The users of key telephone systems and private branch exchanges find the station message detail recording (SMDR) feature a desired capability to monitor, control and plan the telecommunication budget. In the SMDR units of large PBXs, direct distance dial (DDD) calls are priced using the standard FCC tariff No. 263 which considers various call parameters such as distance, time of day and length of the call. While the time of day and length of the call can be readily determined, the calculation of calling distance requires the system to store vast quantities of data. This data base includes data on the approximately 10,000 central offices and their V and H geographic coordinates along with the pricing schemes for the various interstate and intrastate carriers.

Small key telephone systems, however, do not have a sufficiently large memory to store the vast amount of V and H coordinate data required to establish the price of telephone calls using the conventional method. Prior art SMDR systems attempt to compress the V and H data required for determining calling distances.

In one type of SMDR system the calling distance between a customer's communication system and each central office (NNX) in a number plan area (NPA), i.e., area code, is determined and each NNX is assigned to one of the standard fixed calling rate bands. When all of the NNXs in a NPA can be assigned to the same rate band, the NPA can be "compressed" into one pair of V and H coordinates which can be used for all calls to that area code. However, if some NNXs of the NPA fall into different rate bands the data cannot be compressed and each NNX and its V and H coordinates within the NPA must be stored as a comprehensive list. Disadvantageously, this type of SMDR system requires that the compressed data base be individually determined and entered into memory for each communication system. Moreover, this compressed data base must be updated when new NNXs are added by the local telephone companies.

What is desired is a method and apparatus for establishing the price of telephone calls which reduces the size of the data base required and which minimizes the amount of customer programming and data base maintenance.

SUMMARY OF THE INVENTION

The disclosed method reduces the size of the data base required by recognizing that interstate calls can be fairly accurately established by using one pair of V and H coordinates for each NPA rather than using one pair of V and H coordinates for some NPAs and a comprehensive list for others. According to the present invention, the V and H pair of coordinates for a central point of each NPA is determined by a type of averaging process which determines the V and H coordinates that minimize the distance between it and all other NNXs in the NPA. This averaging or centering process produces a pair of coordinates for the central point of each NPA which is then stored in memory. The present method calculates the distance of an interstate telephone call by obtaining from memory and pair of V and H coordinates representing the area code of the called party and subtracting therefrom the V and H coordinates specifying the location of the communication system of the calling party. The price or cost of the call is then determined from the standard pricing tariffs using the determined calling distance, length of the call, and time of day.

In one embodiment, the disclosed pricing method prices certain calls by obtaining a predetermined price code from one of the various user generated tables (e.g., frequently called number table) and uses this price code to establish the cost of the call.

BRIEF DESCRIPTION OF THE DRAWING

The operation of the present invention will be more apparent from the written specification in conjunction with the drawing in which.

GENERAL DESCRIPTION

The present invention as described is incorporated as a part of a station message detail recording (SMDR) capability of a business communication system. The SMDR provides the user with information needed to identify, allocate and control communication cost. The SMDR obtains raw call detail information, to which call cost is added and the information can be sorted into convenient reports. It is obvious that an SMDR including the present invention can be incorporated either into the design of a business communication system, as disclosed, or as a separate unit which connects to a business communication system.

Before describing the present invention, it should be understood that the present call cost establishing capability can be utilized with a single line telephone or with any number of similar communication systems (key systems, private branch exchanges, central office systems, etc.). This specification will describe the operation of the present invention with one type of communication system. In addition, since the present invention may be used with different types of systems each dependent on different hardware constraints and upon different programming techniques, no attempt will be made to detail the entire program used to control the overall system, as such would not enhance the understanding of the present invention but would unnecessarily lengthen this specification.

It will, of course, be obvious to one skilled in the art that in order for the invention described and claimed herein to be used with any communication system, it must be blended into the overall structure of the system in which it is used and must be tailored to mesh with all of the other features and operations of such a system. This patent specification will provide the logical steps necessary for the implementation and blending of the described invention into one such business communication system.

Figure 1:
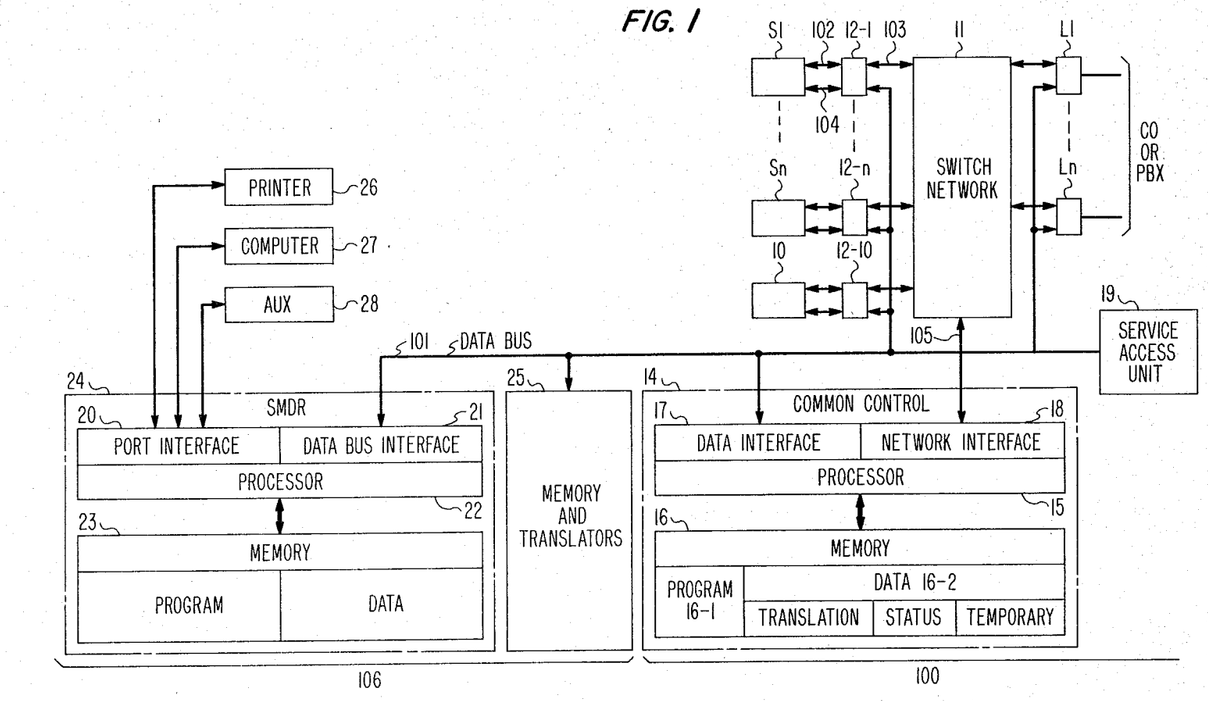
FIG. 1 shows a typical embodiment of the invention as part of a communication system.

In one embodiment the business communication system can be of the type described in the article entitled "HORIZON Communication System: Custom Service for Small Business" written by Mr. R. R. Desjardins et al and published on page 271 et seq. of the *Bell Laboratories Record*, November 1977 and incoporated by reference herein. The above referenced system as illustrated by 100 in FIG. 1 is a station oriented, solid state, stored program controlled, business communication system. System components 10-19, stations S1-SN, and line networks L1-LN of FIG. 1 show the basic communication system without the SMDR capability.

Call processing in the system is under the control of microprocessor 15 in common control 14. Each station, such as station S1, and interface unit or line port, such as 12-1, is scanned by processor 15 to detect any changes in status. In response to any change (e.g., on-hook, off-hook, button depression, etc.), processor 15, per instructions in the stored program in memory 16 translates these changes into system commands. The system receives status and sends commands via bidirectional data bus 101 to each MET station set (multibutton electronic telephone) to light the light emitting diodes (LEDs) and ring the tone ringer associated with the MET set. All of the MET sets provide TOUCH-TONE dialing, tone ringing, and LED indications.

As shown in FIG. 1 there is a voice pair (e.g., 102) connecting each MET station set (e.g., S1) with an associated interface unit (e.g., 12-1) and thence via pair 103 to switching network 11. Additionally, each MET station set has a data in and data out pair (e.g., 104) which connects through the associated interface unit (e.g., 12-1) to data bus 101. Data bus 101 between the station sets and processor 15 is used to transmit information to processor 15 which configures the switch network 11 via bus 105 and sends LED control signal back to the station sets accordingly via data bus 101.

Common control 14 consists of processor 15, interface units 17 and 18 and memory 16. The memory unit consists of a program store 16-1 and a data store 16-2. The data store is subdivided into the following:

A. Translation which contains the hardware configuration data. For example, the button assignments and station class of service.

B. Status which stores the state of the station sets and the system at a given moment.

C. Temporary Data which is used to process a call, e.g., a scratch-pad area.

Service access unit (SAU) 19 connects to data bus 101 and provides a system interface for administration activities such as assigning lines, changing features to the customer's specifications or adding new station features.

A more detailed operation of the communication system shown in 100 of FIG. 1 is described in U.S. Pat. Nos. 4,109,113 issued on Aug. 27, 1978 to Allison et al; 4,150,257 issued on Apr. 17, 1979 to Fenton et al; 4,125,748 issued on Nov. 14, 1978 to Nahabedian et al; 4,150,259 issued on Apr. 17, 1979 to Fenton et al; and reissue patent application, Ser. No. 412,873 filed on Aug. 30, 1982 by Fenton et al which are all incorporated by reference herein.

Figure 7:
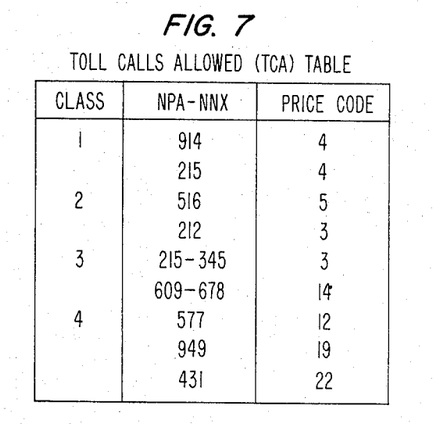

SMDR 24 and memory unit 25 are shown as 106 in FIG. 1. While SMDR is illustrated as separate unit, it obviously can be imbedded as part of communication system 100. SMDR 24 includes a processor 22, port interface 20, data bus interface 21 and memory 23 including data memory and program memory which store the various programs which perform the disclosed method for establishing calling costs. SMDR 24 communicates with communication system 100 and memory unit 25 via data bus 101. To perform the message detailed recording function SMDR 24 receives, in a well known manner, raw call data from communication system 100 via bus interface 21. The received raw data information includes data such as the station set originating a call, the dialed digits or called station number, the time when a call began, the time when a call ends, account codes entered for the call and various control messages. SMDR 24 also checks the toll call allowed (TCA) table, FIG. 7, located in memory 16 of communication system 100.

The customer initializes SMDR by establishing various tables located in memory 25 using SAU 19 of communication system 100. These tables include the frequently called numbers (FCN) table, FIG. 8; price code table, FIG. 9; time of day discount table, FIG. 10; facility price code table, FIG. 11; and personal line code table, FIG. 12. Memory 25 also contains the central point coordinates for all of the area code and the coordinates of the communication system. It should be obvious that the functions of memory 23 and 25 can be redefined without deviating from the principles of the present invention. SMDR 24 uses the raw call data received from communication system 100 and the data in the various tables to establish the cost of various calls. Thereafter, SMDR organizes the information into convenient records and outputs the information via port interface 20 to printer 26, computer 27 and/or any other auxiliary data device 28.

DETAILED DESCRIPTION

The SMDR 106 shown in FIG. 1 compresses the size of the data base required to price interstate calls by using the V and H coordinates of a central point in each area code NPA as the V and H coordinates for calls to any central office NNX in that NPA, irrespective of the fact that some NNXs of that NPA may be in different rate bands. Thus, by compressing data on an area code basis rather than a rate band basis, the user need not manually update the SMDR data base when a new central office NNX is added to any area code. According to the present invention, calls to central offices NNXs of another area code NPA are charged using the central point of the called area code. Thus, since the called central office code is not used to determine the cost of an interstate call, the addition of new central office exchanges would not have to be added to the SMDR data base. The present method recognizes, however, that because interstate calls are to be priced according to the called area code rather than the called central office code or rate band, some call pricing accuracy may be sacrificed.

However, the pricing inaccuracies or errors resulting from pricing interstate calls according to the called area code rather than to the called central office code can be minimized by carefully selecting the central point for each area code. It is desirable to minimize call pricing inaccuracies over all the calls received in an area code. If it is assumed that the received call density is proportional to the number of central offices, a central point selected using an equal weighting of each central office NNX of an area code NPA would minimize the average call pricing error. It is known that the cost of a long distance call is proportional to the calling distance. Thus, a central point selected to minimize the distance between it and all the central office NNXs of an area code would minimize call pricing errors. This is the disclosed method of calculating the central point for an area code NPA.

Figure 2:
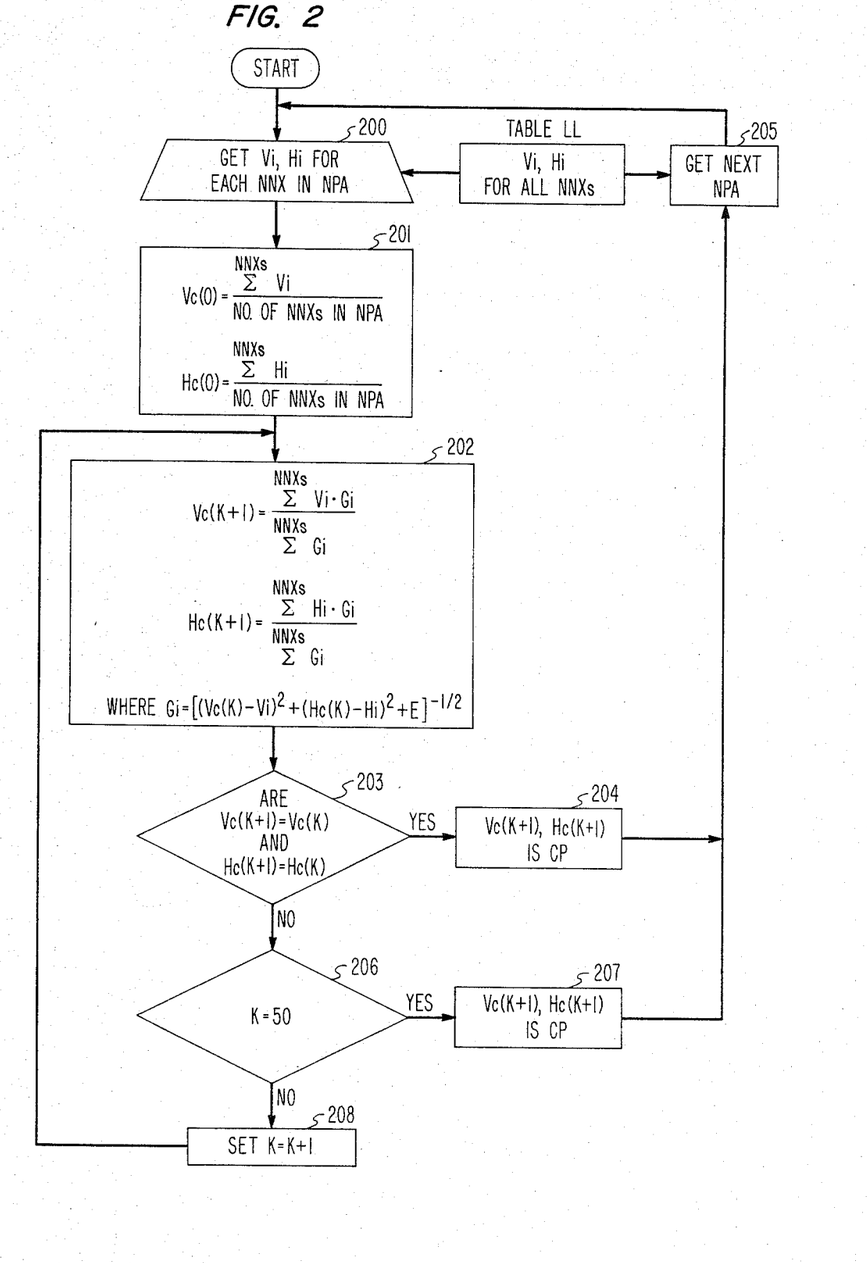
FIG. 2 shows a flow chart for determining the V and H coordinates for each NPA in accordance with the present invention.
Figure 6:
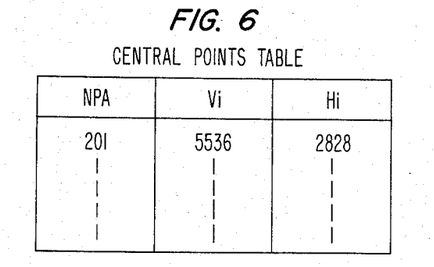
FIGS. 6–12 describe the various tables used for storing information required by the flow charts in FIGS. 2-5.

With reference to FIG. 2, there is illustrated one method of averaging the V and H coordinates of each central office of an NPA to determine a unique pair of V and H coordinates, i.e., a central point for each NPA. Obviously, other methods can be utilized for averaging the coordinates of central offices to determine one pair of coordinates for each NPA. The calculation illustrated in FIG. 2 need be performed only one time and the results stored in ROM in the central points table (FIG. 6) as part of memory 23.

The present invention adapts the solution to the well-known Euclidean-distance problem to determine the unique pair of V and H coordinates for each NPA. The Euclidean-distance problem is one of a family of single-facility location problems which are directed to determining the location of a single new facility with respect to a number of existing facilities. A more complete discussion of these types of problems is discussed in chapter 4, beginning on page 166 in the book entitled "Facility Layout and Location an Analytical Approach", written by Messrs. R. L. Francis and J. A. White and published by Prentice-Hall, Inc. in 1974. The solution to the Euclidean-distance problem is discussed therein on pp. 186-194 of chapter 4.

The present invention recognizes that the general solution of the Euclidean-distance problem can be adapted and used to determine a unique pair of V and H coordinates for each area code. The method of determining these coordinates is illustrated in FIG. 2.

In FIG. 2, $Vc(k)$ and $Hc(k)$ represent, respectively, an estimate of the V and H coordinates of the central point (CP) after the $K^{th}$ iteration through the process. The variable $Vi$ and $Hi$ represent, respectively, the coordinates for central office NNXi. In the method described by FIG. 2, the central point coordinates (V and H) are iteratively determined in succession for each area code NPA. In step 200 the $Vi$ and $Hi$ coordinates for each central office NNXi in the first area code NPA1 are obtained from a table LL. Table LL contains the $Vi$ and $Hi$ coordinates for all of the approximately 10,000 central offices in all of the 106 area codes of the U.S.A. In step 201, as a starting point, the initial iteration (i.e., $K=0$) of the central point (CP) location ($Vc(o)$ and $Hc(o)$) is set equal to the average $Vi$ and $Hi$ coordinate location obtained by summing, respectively, $Vi$ and $Hi$ of all central office codes NNXs of area code NPA1 and by dividing each sum by the number of central office codes NNXs located in the first area code NPA1.

Step 202 adapts the solution of the Euclidean-distance problem to determine the V and H coordinates of a central point of an area code. The Euclidean problem may be stated:

$$\text{minimize } f(V,H) = \overset{NNX}{\Sigma} Wi[(Vc - Vi)^2 + (Hc - Hi)^2]^{\frac{1}{2}}$$

and can be approximated by:

$$\text{minimize } f(V,H) = \overset{NNX}{\Sigma} Wi[(Vc - Vi)^2 + (Hc - Hi)^2 + E]^{\frac{1}{2}}$$

where E is an arbitrarily small positive constant. (See the previously referenced Francis & White book for an explanation of the approximation.) Since in our example all central offices are to be equally weighted in the determination of the central point $Wi=1$. Computing the partial derivative of the above-identified approximation formula and setting them to zero and then solving for $Vc$ and $Hc$ results in the expression shown in step 202. In step 202 the variable E is a constant, equal to 1 herein, added to prevent the expression in the brackets from equaling 0 from some i. The solution in step 202 involves an iterative process using the starting values $Vc(o)$ and $Hc(o)$ as the $Vc(k)$ and $Hc(k)$ and then calculating values of $Vc(k+1)$ and $Hc(k+1)$. The process in the calculations $Vi$ and $Hi$ are the coordinates for central office NNXi.

In step 203 when $Vc(k+1)=Vc(k)$ and $Hc(k+1)=Hc(k)$ the values $Vc(k+1)$ and $Hc(k+1)$ are stored as the central point CP, step 204, for that area code. In step 205 the next area code is selected and in step 200 the $Vi$ and $Hi$ coordinates for the central office NNXi for the new area code NPA are obtained from table LL.

When the conditions of step 203 are not satisfied step 206 is performed. Note, the variable K is set to some predetermined number, 50 used herein, which results in the difference between $Vc(k+1)-Vc(k)$ and $Hc(k+1)-Hc(k)$ being very small. In step 206 when $k=50$, step 207 stores the values as the central point CP for the area code and step 205 again selects the next NPA on the list. In step 206 when k is not equal to 50, step 208 increases k to $k+1$ and returns control to step 202. Obviously, the method described in FIG. 2 is completed when a central point CP has been found for all NPAs in table LL. The central points CP for all area codes NPAs are then loaded into a CP table, FIG. 6, which is implemented in ROM in the SMDR system. This table, shown in FIG. 6, when reference by the NPA number, supplies a four digit V and H coordinate for the central point of each NPA.

Figure 3:
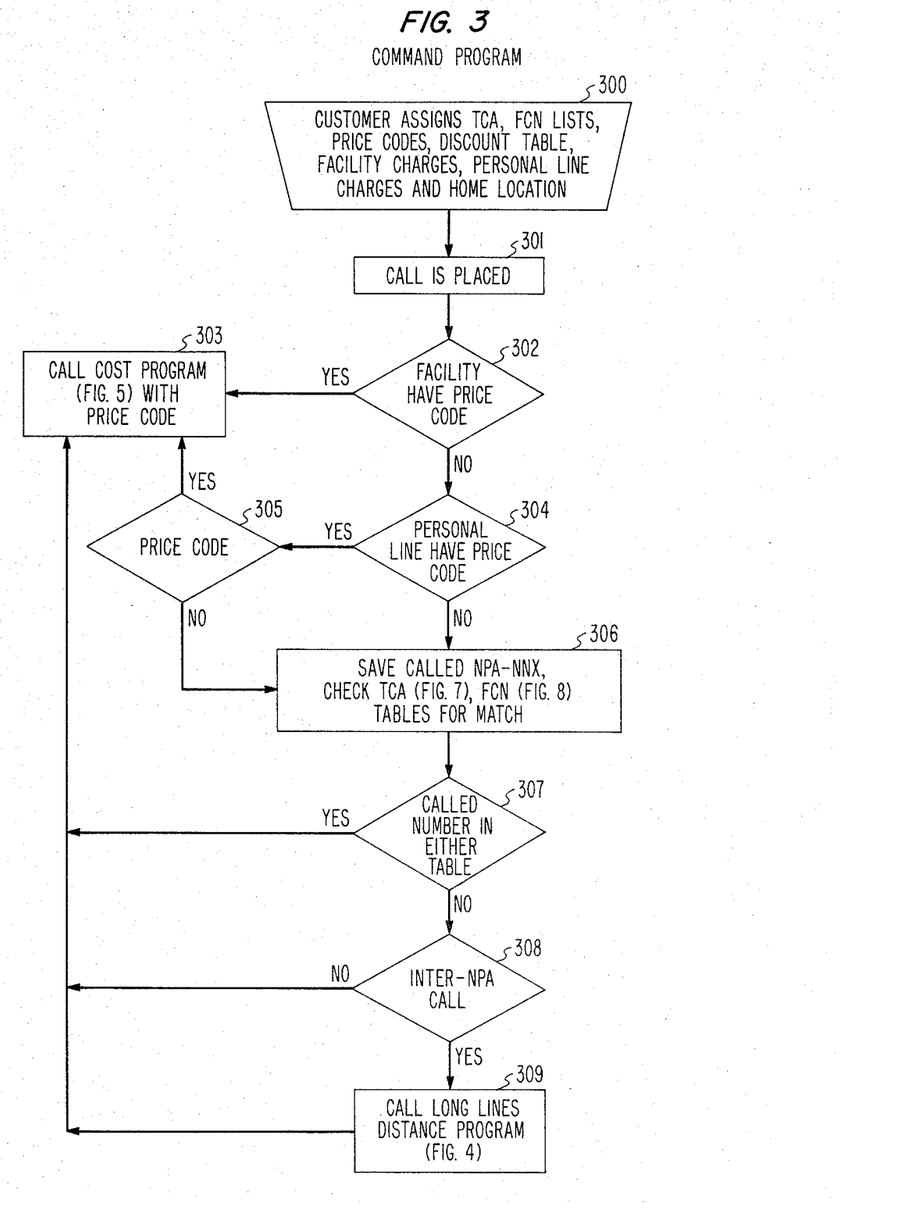
FIG. 3 shows an overall system program flow chart for determining in accordance with the present invention the price code of any call originated by station sets of the communication system shown in FIG. 1.

According to one embodiment of the present invention the central point CP for each area code NPA is supplied to the SMDR system for use in establishing the cost of a call using the Command program illustrated in FIG. 3. With reference to FIG. 3, a customer or user has two options for pricing his calls. As will be described, the user may price interstate calls using the central point for each NPA or may price certain interstate calls on the basis of the called central office or both. Thus, the customer may decide that the use of a central point CP for pricing distant interstate calls is appropriate while near interstate calls are priced using central office pricing information stored in a customer generated table.

In step 300 of FIG. 3, the customer programs several tables into the SMDR memory 23 using the service access unit SAU (19 of FIG. 1). One such table is the toll calls allowed (TCA) table, FIG. 7, which lists the toll calls permitted by the system. The TCA includes the various NPA—NNX combination to which outgoing calls can be dialed. Entering only an NNX code permits calls to that local central office to be dialed. An entry NPA permits any calls to that area code to be made. An entry NPA—NNX permits calls to only that central office of that area code. Additionally, the stations of the system can be assigned to one of 4 classes of service. Those stations associated with class 1 can call any number listed in any of the class lists. Stations in class 2 can call any number listed in class lists 2, 3 and 4; and so forth. Stations not attached to any list are not toll restricted; however, they may be prevented from using all or part of the outgoing facilities. Each entry of the TCA table may also have attributed to it a two digit price code (1–40), which corresponds to an entry in the price code table, FIG. 9.

Figure 8:
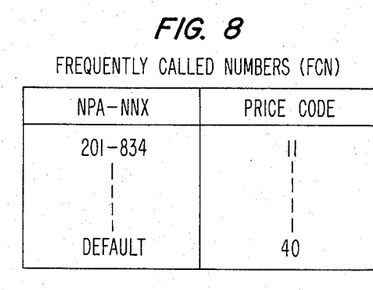

A frequently called number (FCN) table, FIG 8, enables a customer to program the price code to be used to charge certain calls. The FCN table includes memory for storing a number of NNX—NPA combinations and the price codes to be used therewith.

Figure 9:
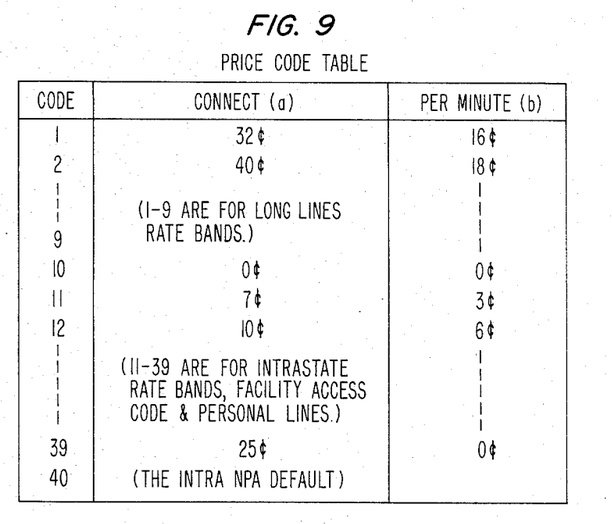

The customer also programs a price code table, FIG. 9, which list the cost for the first minute (connect charge) and each additional minute (per minute charge) for each type of call. The first 9 entries of this table store the standard AT&T Long Lines rate bands. The tenth entry is the free call entry, i.e., 0 connect and 0 per minute charge. Entries 11–39 of this table store various rates to local central offices selected by the customer to fit his particular calling pattern. Part of these entries will usually include the local telephone company's intrastate charges. Entry 40 is meant to be a customer-determined default price to be charged on each intra NPA call not in the TCA table. Each entry in the TCA table is assigned a price code which corresponds to an entry in the price code table.

Figure 5:
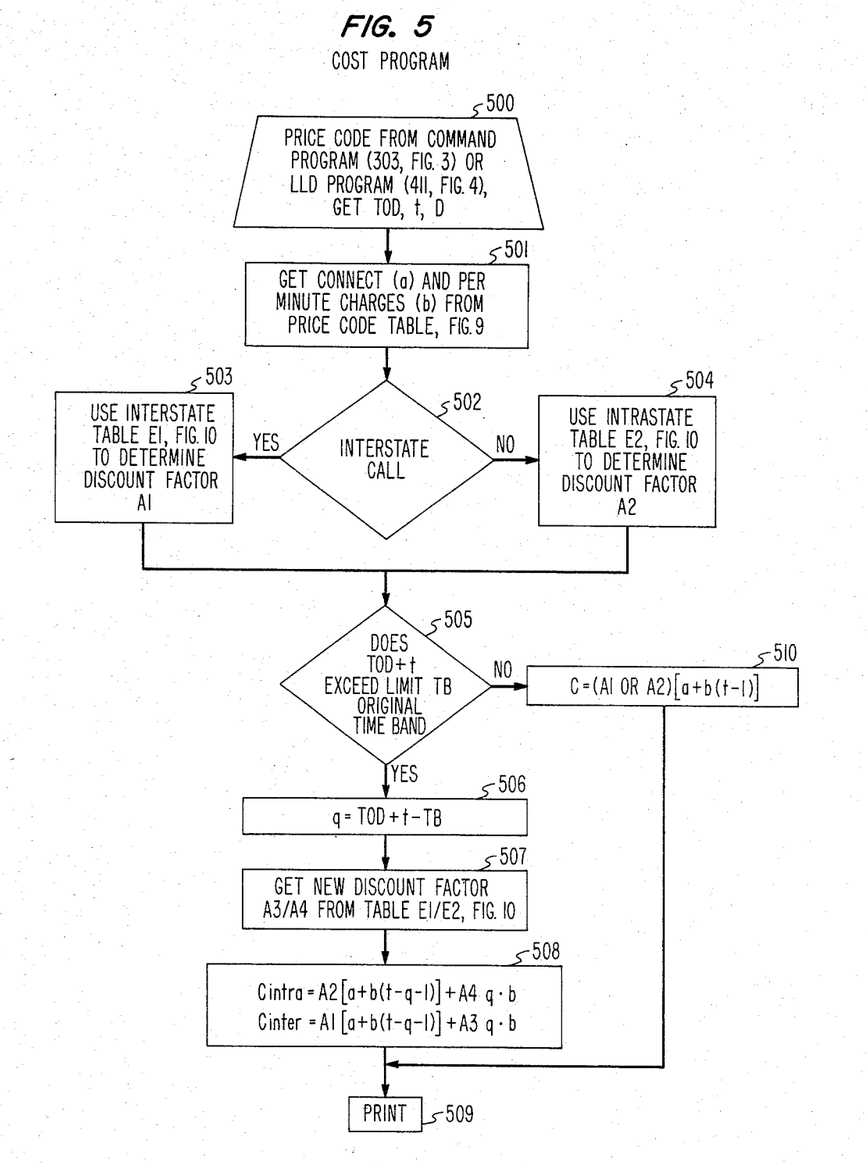
FIG. 5 shows a flow chart of a method of determining the cost of calls using the price code information determined in FIGS. 3 and 4.
Figure 10:
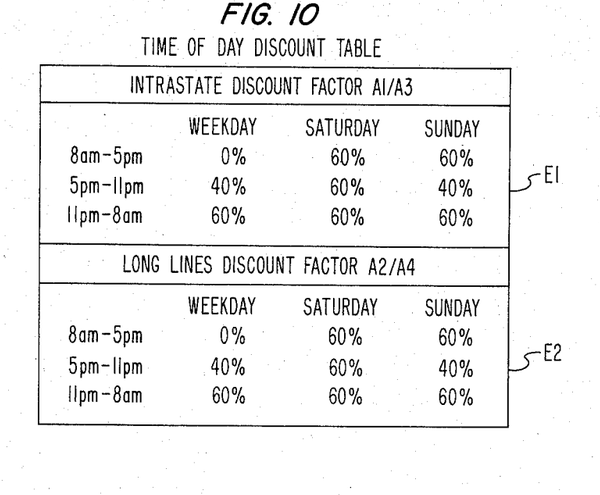

The time of day discount table, FIG. 10, lists the different discounts applicable to calls made at different times. One part of the table is used for interstate calls and one part is used for intrastate calls. These tables are accessed by the Cost program (FIG. 5). The discounts listed in the table are accessed by time of day and day of week. The number listed in the table indicating the discount from the full price. The various coefficients are entered by the customer using the SAU.

Figure 11:
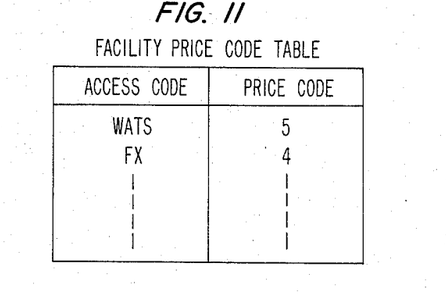

The facility price index code table, FIG. 11, assigns a price code (per minute and connect) to certain calls requesting facilities such as wide area telephone service (WATS) and foreign exchange (FX). This table is accessed using the access codes associated with the service. The index into this table is the facility access code, for example, 9 for CO line, 101 for WATS, 102 for Boston, 103 for Philadelphia, etc. Again the user enters these access codes and associated price codes via the SAU.

Figure 12:
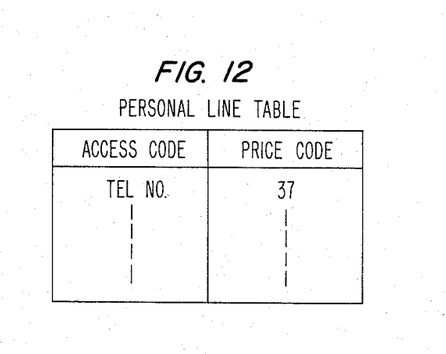

The personal line price index code table, FIG. 12, performs the same function for personal lines as the facility price index code does for the facility access codes and are also entered by the customer via the SAU. The home location V and H coordinates of the system (FIG. 1) are obtained from the SMDR equipment manufacturer or distributor and are entered in memory 23 by the customer using SAU 19.

After the customer has initialized the system by entering the data for the various tables, the command program shown in FIG. 3 can establish the price of a call made from a station set of the system to any phone in the contiguous U.S. Obviously, the scope of the disclosed invention can be extended to price a call made to any location in the world using any distance based common carrier price codes. When a call is placed, step 301, the command program checks, step 302, if the facility access code is in the facility table, FIG. 11. If the access code is priced using the facility table, FIG. 11, the associated predetermined price code for that facility is used to price the call and program Cost is called, 303. If the facility table, FIG. 11, has no price code the program checks, 304, the personal line table of FIG. 12 to determine if it is a personal line and if it is explicitly priced therein. If so, the associated price code is used and program Cost is called, 303. Otherwise, the area code NPA and central office NNX portions of the called number are checked, 306, for a match in the TCA table, FIG. 7, and in the FCN table, FIG. 8. It should be noted that both the facility access code and the line access code (e.g., personal line code), associated with a call can be part of the dialed number, can be a predetermined button on the user station set or can be automatically selected by the system.

If the combinations NPA—NNX is not found in the TCA or FCN table, the program will look for a match for only the NPA. If a match is found, 307, the associated predetermined price code is obtained from the table and the Cost program called, 303. If no match is found, the program determines, 308, if the call is an inter-area code (NPA) call (an area code used) or an intra-area code call (no area code used). If no area code is present in the called number then price code 40, the intra-NPA default price code, is used and the Cost program is called. If an area code is present, then the call is priced using the long lines distance (LLD) program of FIG. 4, 309, using the central point coordinates for the called NPA as previously determined and stored in the central points table, FIG. 6. After the LLD program has determined a price code then the Cost program is called to specify the cost of the call.

Figure 4:
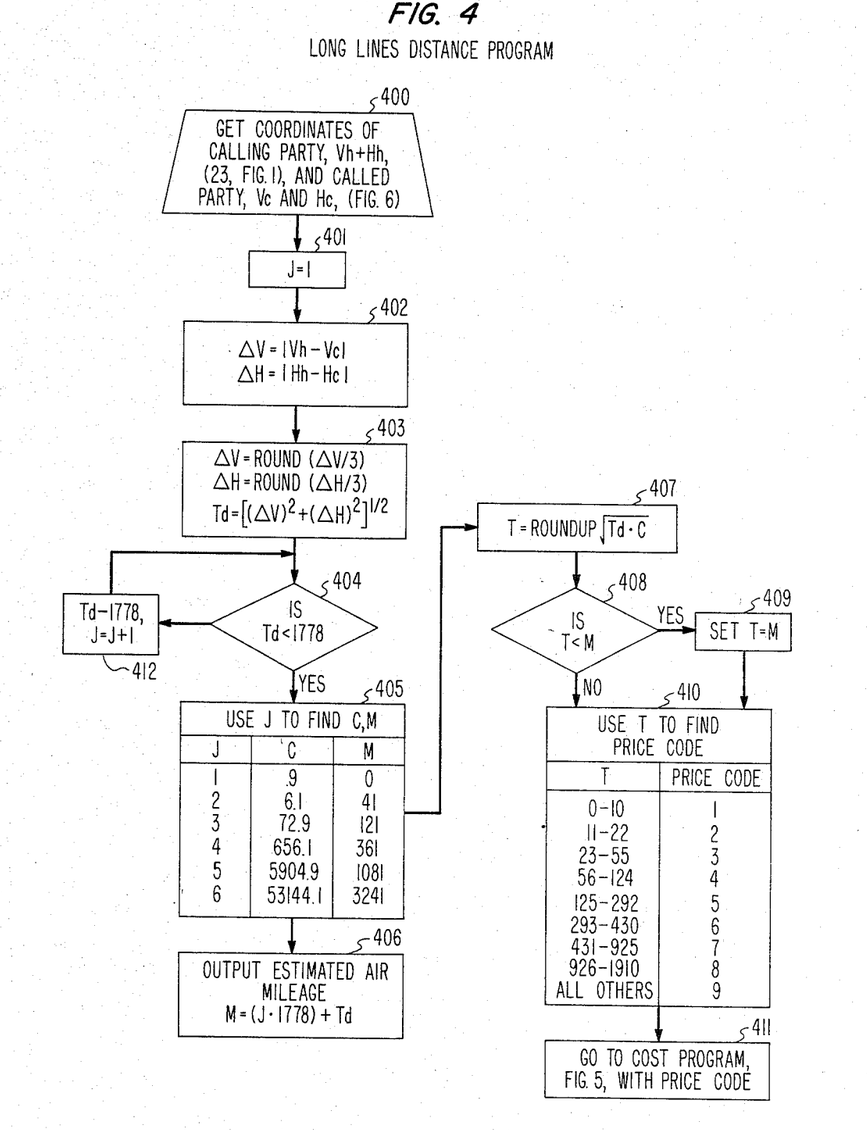
FIG. 4 shows a flow chart describing a method of determining the calling distance and pricing codes in accordance with the present invention.

Assuming that the long lines distance (LLD) program is called, 309, then the program steps of FIG. 4 are performed. Note, FIG. 4 represents an implementation of the well-known long lines distance algorithm, except that the supplied V and H coordinates of the called NPA is used rather than the NPA—NNX of the called number. With reference to FIG. 4, in step 400, the home location Vh and Hh of the calling party and the supplied Vc and Hc coordinates of the central point of the area code of the called party are obtained from their respective memories 23 and FIG. 6. The variable J is set to 1 in step 401 and in step 402 the absolute differences in the coordinates $\Delta V$ and $\Delta H$ are determined. In step 403, $\Delta V$ and $\Delta H$ are divided by 3 and rounded to the nearest integer and, the distance Td is determined and in step 404 compared to 1778. If Td is not less than 1778, step 412, then 1778 is substracted from Td and value J is set equal to J+1 and returned to step 404. If Td is equal to or less than 1778 then table 405 is checked, in step 405, using the value of J to determine the corresponding values for C and M.

It should be noted that the mileage determined by this program is the estimated air mileage between the calling and called parties. This estimated air mileage can be outputted, step 406, in a well-known manner to the user for various business purposes such as estimating travel distance, travel time, shipping expenses, etc. between the user and business clients.

In step 407 the value Td is multiplied by C and the square root determined and rounded up to the next higher integer to form the value T. In step 408 T is compared with M. If T is less than M, T is set equal to M in step 409 and used to find the price code in step 410. If T is equal to or more than M then T is used to find the price code in step 410. In step 410 a price code is assigned according to the mileage T, this price code being used to determine the connect and per minute charges. After the price code is assigned the Cost program is called in step 411 to determine or specify the cost of the call being made.

With reference to FIG. 5, the Cost program which determines the cost of a call will be described. In step 500 the price code is received when the program is called by either the command program, step 303 of FIG. 3 or by LLD program, step 411 of FIG. 4. Additionally, the Cost program obtains the time of day (TOD) that the call began, the duration (t) of the call and the day of the week (D). In step 501 the Cost program uses the price code to obtain the connect charges (a) and the per minute charges (b) from price code table, FIG. 9. In step 502 the program determines if the call is an interstate call. More particularly, an interstate call is determined by comparing the called and calling NPAs to a table (not shown) containing a list of all NPAs and the states in which they reside. If so, the interstate section E1 of discount table, FIG. 10, is used in step 503, to determine discount factor A1 using the day D and time of day TOD data. If not an interstate call, the intrastate part E2 of discount table, FIG. 10, is used in step 504, to determine the discount factor A1 using the day D and time of day TOD data.

Thereafter, in step 505 the termination time of the call (TOD+t) is checked to see if the call has extended beyond the original timeband TB into a different time discount band. If so the amount of time q that the termination of the call has exceeded the boundary of the time band (TB) when the call was originated is determined in step 506.

In step 507 a new discount factor is determined for the new time band. If the call was an intrastate call then the discount factor A4 is found in table E2. If the call was an interstate call then the discount factor A3 is found in table E1. In step 508 the cost is established for an intrastate call using discount factors A2 and A4 and for an interstate call using discount factor A1 and A3. These call costs may be stored in memory and printed out, step 509, later at the convenience of the customer.

Returning to step 505, if the termination time of the call (TOD+t) does not extend into a new time discount band, then step 510 is performed. In step 510 if the call was an intrastate call then discount factor A2 is used and if the call was an interstate call then discount factor A1 is used. Again those call costs may be stored in memory and printed out, step 509, at the convenience of the customer.

What has been described is merely illustrative of our invention, other embodiments known to those skilled in the art could be utilized without departing from the spirit and scope of the present invention. Additionally, other applications to telephone or other communication systems other than the disclosed system are contemplated as being within the knowledge of one skilled in the art.

What is claimed is:

1. A method of establishing the cost of a telephone call made from a first telephone located in a first area code to a second telephone located in one of a number of second area codes the method comprising the steps of:

providing a pair of coordinates based on the geographical location of said first telephone, supplying a unique pair of geographical coordinates for each of said number of second area codes, and determining said telephone cost using the provided coordinates for said first telephone and the supplied coordinates for said one of said number of second area codes within which said second telephone is located.

2. The method of claim 1 wherein said supplying step includes the step of determining said geographical coordinates for each area code by averaging the vertical and horizontal geographical coordinates of each central office located in said area code.

3. The method of claim 2 wherein said coordinate determining step adjusts said average geographical coordinates for each area code using a predetermined formula to minimize the distance between said adjusted geographical coordinates and the geographical coordinates of each central office located in said area code.

4. The method of claim 1 wherein said cost determining step includes the step of assigning a long distance price code using the provided coordinates of said first telephone and the supplied coordinates for the area code of said second telephone, and specifying the cost of said telephone call using said price code.

5. The method of claim 1 including a called number checking step preceding said cost determining step, wherein said called number checking step checks a frequently called number table for the called number, the presence of said called number causing an associated price code to be used in specifying the cost of said telephone call and the absence of said called number causing the processing of said cost determining step.

6. The method of claim 1 including an inter-area code checking step preceding said cost determining step which checks the called number for an area code, the presence of said area code causing the processing of said cost determining step and the absence of said area code causing the use of a predetermined default price code to establish the cost of said telephone call.

7. The method of claim 1 including a facility checking step preceding said cost determining step which checks for a facility access code associated with the telephone call, the presence of said facility access code in a facility table being used to obtain a predetermined price code from the facility table for use in specifying the cost of said telephone call and the absence of said facility access code in the facility table causing the processing of said cost determining step.

8. The method of claim 1 including a personal line checking step preceding said cost determining step which checks for a line access code associated with the telephone call, the presence of said line access code being used to obtain a predetermined price code from a personal line table for use in specifying the cost of said telephone call and the absence of said line access code causing the processing of said cost determining step.

9. A method of establishing the distance between a calling party located in one area code and a called party located in a different area code using a telephone call made between the parties, the method comprising the steps of:

provinding a pair of coordinates specifying the location of said calling party, supplying a pair of coordinates for each different area code to which telephone calls can be made, and determining the distance using said provided coordinates of said calling party and the supplied coordinates of the area code of the called party.

10. The method of claim 9 wherein said supplying step includes the step of determining said geographical coordinates for each area code by averaging the vertical and horizontal geographical coordinates of each central office located in that area code.

11. The method of claim 10 wherein said determining step adjusts said average geographical coordinates for each area code using a predetermined formula to minimize the distance between said adjusted geographical coordinates and the geographical coordinates of each central office located in said area code.

12. Telephone call pricing apparatus for establishing the cost of a telephone call made from a first telephone located in a first area code to a second telephone located in one of a number of second area codes, said apparatus comprising means for providing a pair of coordinates based on the geographical location of said first telephone, means for supplying a unique pair of geographical coordinates for each of said number of second area codes, and means for determining said telephone cost using the provided coordinates for said first telephone and the supplied coordinates for said one of said number of second area codes within which said second telephone is located.

13. Telephone call pricing apparatus for establishing the cost of a telephone call made from a first telephone located in a first area code to a second telephone located in one of a number of second area codes, said apparatus comprising means responsive to said telephone call for receiving a pair of coordinates based on the geographical location of said first telephone, means for supplying a pair of geographical coordinates for the area code in which the called said second telephone is located and means for determining said cost using said coordinates of said first telephone and said coordinates for said area code of the called said second telephone.

* * * * *